United States Patent [19]

Anthony

[11] Patent Number: 4,461,792

[45] Date of Patent: Jul. 24, 1984

[54] POLY-1-BUTENE MULTILAYERS PLASTIC FILM

[75] Inventor: John Anthony, Downers Grove, Ill.

[73] Assignee: Union Carbide Corporation, Danbury, Conn.

[21] Appl. No.: 428,996

[22] Filed: Sep. 30, 1982

[51] Int. Cl.³ ............................................. B32B 7/02
[52] U.S. Cl. ..................................... 428/35; 428/216; 428/516; 428/349
[58] Field of Search ................ 428/515, 516, 213, 216, 428/349, 35

[56] References Cited

U.S. PATENT DOCUMENTS

| | | | |
|---|---|---|---|
| 3,281,501 | 10/1966 | Coats et al. | 260/897 |
| 3,694,524 | 9/1972 | Tinger et al. | 260/897 |
| 4,000,234 | 12/1976 | Pilgrim et al. | 264/95 |
| 4,076,698 | 2/1978 | Anderson et al. | 526/348.6 |
| 4,339,504 | 7/1982 | Luebbe et al. | 428/516 |
| 4,339,507 | 7/1982 | Kurtz et al. | |
| 4,346,834 | 8/1982 | Mazumdar | 428/516 |
| 4,356,221 | 10/1982 | Anthony et al. | 428/516 |
| 4,359,561 | 11/1982 | Fraser et al. | |
| 4,444,828 | 4/1984 | Anthony et al. | |

FOREIGN PATENT DOCUMENTS 3054283  5/1978  Japan .................................. 428/516

*Primary Examiner*—George F. Lesmes
*Assistant Examiner*—E. Rollins Buffalow
*Attorney, Agent, or Firm*—John C. LeFever; Real J. Grandmaison

[57] ABSTRACT

A multilayer plastic film suitable for use in the manufacture of garbage and trash bags wherein the film comprises one or more layers representing at least one first outer layer comprising poly-1-butene and at least one second outer layer comprising low pressure, low density polyethylene.

24 Claims, No Drawings

POLY-1-BUTENE MULTILAYERS PLASTIC FILM

This invention relates to a multilayer plastic film, and more particularly, to a multilayer plastic film suitable for use in the manufacture of garbage and trash bags.

In general, plastic garbage and trash bags for bulk waste material may be produced in film form from various polymers such as polyethylene. The films used for such bags should desirably possess high strength characteristics such as puncture toughness, tensile strength and Elmendorf tear strength. Another desirable property of plastic bags is low manufacturing cost. It will be recognized that the required quantity of raw material may be reduced by use of polyethylene film having the previously mentioned high strength characteristics, and in part for this reason, multiple layer plastic films have been used to manufacture garbage bags.

With the introduction of linear low density polyethylenes made by the low pressure processes, attempts have been made to substitute this material for film applications in place of conventional highly branched low density polyethylenes made by high pressure processes. The reason for these efforts is that low pressure, low density polyethylene is widely recognized as being tougher and stronger than high pressure, low density polyethylene. However, it has been discovered that while the transverse direction Elmendorf tear strength of low pressure, low density film is substantially higher than that of high pressure, low density polyethylene film, the machine direction Elmendorf tear strength for low pressure, low density polyethylene film is substantially lower than that of high pressure, low density polyethylene film, even though other physical properties of low pressure, low density polyethylene are superior.

In addition, polyethylene film for the production of consumer garbage and trash bags is generally prepared in the thickness range of between about 1.25 mils and about 3.0 mils. As earlier indicated, it is customary for low density polyethylene, produced by the standard high pressure process, to be used as the basic polymer or raw material for this product because of its relatively low cost, good physical properties, ease of extrusion at high rates, good heat seal strength, and ability to be readily converted into the finished product.

There is, however, a continuous need for stronger films for this application which will be even more resistant to damage by puncture, tearing, or yielding under stress, and which have greater machine direction tear strength. A stronger film is not only desirable from the standpoint that the finished bag is more serviceable in the end-use, but also in that a thinner film can be used and still meet the necessary strength requirements, thus providing a better cost-performance relationship for the consumer.

It is also desirable to obtain a thinner bag that will function as a trash and garbage container at a performance level generally requiring a thicker bag to enable the manufacturer to produce the bag at a higher rate such that increased linear feet per unit of time results in lower cost and less resin is required per bag.

In accordance with this invention there is provided a multilayer plastic film possessing improved puncture toughness, tensile strength, yield strength and tear strength over conventional multilayer polyethylene films.

The multilayer plastic film of this invention is eminently suitable for use in the manufacture of garbage and trash bags which, in one embodiment, comprises a first outer layer of a poly-1-butene polymer and a second outer layer comprising low pressure, low density polyethylene. It has been found that the multilayer film of this invention has physical properties, such as puncture toughness, tensile strength, and machine direction tear strength which are substantially improved over those of conventional multilayer films made from polyethylene in all layers thereof or from blends of high pressure, low density polyethylene and low pressure, low density polyethylene. A higher machine direction tear strength results in a film which is highly desirable from an end-use standpoint.

Consequently, it has been found that a multilayered, coextruded film comprising the poly-1-butene resins of this invention as one or more first outer layers, and low pressure, low density polyethylene or blends of low pressure, low density polyethylene containing up to about twenty percent by weight of poly-1-butene as one or more second outer layers of the co-extruded film results in a superior, stronger film and trash bag.

The poly-1-butene polymer comprising one or more layers of the multilayer film of this invention may have a melt index of between about 1 and about 2 decigrams per minute. While the lower melt index is preferred for superior strength, the essence of the invention may still be maintained, although to a lesser degree, at the higher melt index. Poly-1-butene polymer available from Shell Chemical Company under the tradename Witron 1600 SA has been found to provide especially desirable strength properties to the plastic film of this invention, and when coextruded with the low pressure, low density polyethylene polymers of this invention, a combination of physical properties provided by the desirable properties of both resins is obtained.

The low pressure, low density polyethylene comprising one or more layers of the multilayer film of this invention may comprise copolymers formed from ethylene and a comonomer selected from butene, pentene, hexene, heptene and octene, and mixtures thereof. These copolymers may have a melt index of between about 0.3 and about 3.0 decigrams per minute. However, it is preferred that the copolymers have a melt index of between about 0.5 and about 2.0 decigrams per minute because as the melt index decreases, viscosity increases and extrusion becomes more difficult requiring more powerful extruders. In addition, as melt index increases, such results in a lowering of the physical properties of the film, notably tensile strength and puncture toughness energy. In addition, the copolymers may have a density of between about 0.916 and about 0.925 grams per cubic centimeter. The lower limit on density is primarily dictated by the ability to produce the polymers below that value. However, as the density increases, machine direction tear strength is found to lessen. Thus, it is preferred that the copolymers have a density of between about 0.917 and about 0.920 grams per cubic centimeter. Likewise, it is preferred that the low pressure, low density polyethylene comprise a copolymer of ethylene and butene-1.

The low pressure, low density polyethylene employed in this invention may also comprise heterogeneous copolymers formed from ethylene, and at least one of propylene and butene-1 and at least one $C_5$–$C_8$ comonomer. By the term heterogeneous, it is meant that the comonomer units are distributed randomly along a polymer chain but do not have the same ethylene/comonomer ratio among the polymer molecules. The ethylene copolymers are interpolymers or copolymers of the monomers $C_2$, $C_a$ and $C_b$, wherein $C_2$ is ethylene, $C_a$ is selected from propylene, butene-1 and mixtures thereof, and $C_b$ is selected from one or more of the $C_5$ to $C_8$ alpha monoolefins which contain no branching closer than the fourth carbon atom. The $C_5$ to $C_8$ monomers include pentene-1, 4-methyl pentene-1, hexene-1, heptene-1 and octene-1.

The $C_2$, $C_a$ and $C_b$ monomer units are believed to be randomly distributed along the polymer chain and do not have the same ethylene/comonomer ratio among the polymer molecules. The molar ratio of $C_a/C_2$ monomer units in the polymer mass is about 0.006 to 0.09. The molar ratio of $C_b/C_2$ monomer units in the polymer mass is about 0.003 to 0.07. In addition, the $C_a$ and $C_b$ monomers are also used in such amounts as to provide a Branch Chain Factor value of about 0.1 to 0.9 preferably of about 0.2 to 0.8, where the $$\text{Branch Chain Factor} = \frac{\text{number of carbon branches of } C_3 \text{ to } C_6 \text{ length in polymer}}{\text{total number of carbon branches of } C_1 \text{ to } C_6 \text{ length in polymer}}.$$

The copolymers have a density of about 0.91 to 0.94, a melt flow ratio of $\geq 22$ to $\leq 36$ and preferably of about $\geq 25$ to $\leq 32$, and a melt index of about 0.5 to 5.0.

The melt flow ratio value is one means of indicating the molecular weight distribution of a polymer. The melt flow ratio (MFR) range of $\geq 22$ to $\leq 36$ thus corresponds to $M_w/M_n$ value range of about 2.7 to 4.3 and the MFR range of $\geq 25$ to $\leq 32$ corresponds to a $M_w/M_n$ range of about 2.8 to 3.8. $M_w$ stands for weight average molecular weight, and $M_n$ stands for number average molecular weight.

The copolymers have an unsaturated group content of $\leq 1$, and usually of $\geq 0.1$ to $\leq 0.6$, C=C/1000 carbon atoms.

The copolymers can be readily produced in a low pressure gas phase fluid bed reaction process, as disclosed below, if a specific monomer charge is polymerized under a specific set of operating conditions, as disclosed below, and in the presence of a specific high activity catalyst, which is also described below.

HIGH ACTIVITY CATALYST

The compounds used to form the high activity catalyst used in the present invention comprise at least one titanium compound, at least one magnesium compound, at least one electron donor compound, at least one activator compound, and at least one porous inert carrier material, as defined below.

The titanium compound has the structure $$Ti(OR)_a X_b$$

wherein
R is a $C_1$ to $C_{14}$ aliphatic or aromatic hydrocarbon radical, or COR' where R' is a $C_1$ to $C_{14}$ aliphatic or aromatic hydrocarbon radical,
X is selected from the group consisting of Cl, Br, I, or mixtures thereof, a is 0 or 1, b is 2 to 4 inclusive and $a+b=3$ or 4.

The titanium compounds can be used individually or in combinations thereof, and may include $TiCl_3$ and $TiCl_4$, $Ti(OCH_3)Cl_3$, $Ti(OC_6H_5)Cl_3$ and $Ti(OCOC_6H_5)Cl_3$.

The magnesium compound has the structure $$MgX_2$$

wherein X is selected from the group consisting of Cl, Br, I, or mixtures thereof. Such magnesium compounds can be used individually or in combinations thereof and may include $MgCl_2$, $MgBr_2$ and $MgI_2$. Anhydrous $MgCl_2$ is the particularly preferred magnesium compound.

About 0.5 to 56, and preferably about 1 to 10, mols of the magnesium compound are used per mol of the titanium compound in preparing the catalysts employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are partially or completely soluble. The electron donor compounds are known as such, or as Lewis bases.

The electron donor compounds may include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids, alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ether; $C_3$ to $C_6$, and preferably $C_3$ to $C_4$, aliphatic ketones. The most preferred of these electron donor compounds are methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 10 mols of the electron donor compound are used per mol of Ti.

The activator compound has the structure $$Al(R'')_c X'_d H_e$$

wherein X' is Cl or OR''', R'' and R''' are the same or different and are $C_1$ to $C_{14}$ saturated hydrocarbon radicals, d is 0 to 1.5, e is 1 or 0 and $c+d+e=3$.

Such activator compounds can be used individually or in combinations thereof and may include $Al(C_2H_5)_3$, $Al(C_2H_5Cl)$ $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

About 10 to 400, and preferably about 10 to 100, mols of the activator compound are used per mol of the titanium compound in activating the catalyst employed in the present invention.

The carrier materials are solid, particulate porous materials which are inert to the other components of the catalyst composition, and to the other active components of the reaction system. These carrier materials may include inorganic materials such as oxides of silicon and/or aluminum. The carrier materials are used in the form of dry powders having an average particle size of about 10 to 250 microns, and preferably of about 50 to 150 microns. These materials are also porous and have a surface area of $\geq 3$, and preferably of $\geq 50$, square meters per gram. Catalyst activity or productivity is apparently also improved with silica having pore sizes of $\geq 80$ Angstrom units and preferably of $\geq 100$ Angstrom units. The carrier material should be dry, that is, free of absorbed water. Drying of the carrier material is carried out by heating it at a temperature of $\geq 600°$ C. Alternatively, the carrier material dried at a temperature of $\geq 200°$ C. may be treated with about 1 to 8 weight percent of one or more of the aluminum alkyl compounds described above. This modification of the support by the aluminum alkyl compounds provides the catalyst compositions with increased activity and also improves polymer particle morphology of the resulting ethylene polymers.

The copolymer polymerization reaction is conducted by contacting a stream of the monomers, in a gas phase process, such as in a fluid bed process as described in U.S. Pat. No. 4,243,619 and substantially in the absence of catalyst poisons such as moisture, oxygen, carbon monoxide, carbon dioxide and acetylene with a catalytically effective amount of the completely activated precursor composition (the catalyst) impregnated on a support at a temperature and at a pressure sufficient to initiate the polymerization reaction.

In order to achieve the desired density ranges in the copolymers it is necessary to copolymerize enough of the (i) $C_a$ comonomers with ethylene and the $C_b$ comonomers to achieve a level of about $\geq 0.6$ to 9 mol percent of the $C_a$ comonomer in the copolymer, and (ii) $C_b$ comonomers with ethylene and the $C_a$ comonomers to achieve a level of about $\geq 0.3$ to 7 mol percent of the $C_b$ comonomer in the copolymer. The amounts of the $C_a$ and $C_b$ comonomers needed to achieve this result will depend on the particular comonomers employed.

There is provided below a listing of the amounts, in mols, of various $C_a$ and $C_b$ comonomers that are copolymerized with ethylene in order to provide polymers having the desired density range at any given melt index. The listing also indicates the relative molar concentration, of such comonomers to ethylene, which are to be present in the recycled gas stream of monomers ($C_2$, $C_a$ and $C_b$) under reaction conditions in the reactor.

| Cx comonomer | $C_x/C_2$ mol Ratio in gas phase at equilibrium | $C_x/C_2$ mol Ratio in polymer |
| --- | --- | --- |
| propylene | 0.2 to 0.9 | 0.01 to 0.09 |
| butene-1 | 0.1 to 0.5 | 0.006 to 0.08 |
| pentene-1 | 0.05 to 0.2 | 0.005 to 0.07 |
| hexene-1 | 0.02 to 0.15 | 0.004 to 0.06 |
| 4-methyl-pentene-1 | 0.02 to 0.15 | 0.004 to 0.06 |
| heptene-1 | 0.017 to 0.10 | 0.003 to 0.04 |
| octene-1 | 0.015 to 0.08 | 0.003 to 0.04 |

The fluid bed reactor is operated at pressures of from about 50 to about 1000 psi, and is preferably operated at a pressure of from about 150 to 350 psi, with operation at the higher pressures in such ranges favoring heat transfer since an increase in pressure increases the unit volume heat capacity of the gas.

The heterogeneous copolymers formed from ethylene, at least one of propylene and butene-1 and at least one $C_5$-$C_8$ comonomer generally have a melt index of between about 0.3 and about 3.0 decigrams per minute and a density of between about 0.91 and about 0.94 grams per cubic centimeter. However, it is preferred that the copolymers have a melt index of between about 0.5 and about 2.0 decigrams per minute, and a density of between about 0.917 and about 0.930 grams per cubic centimeter, because a better balance of physical properties is provided to the multilayer film of this invention. Likewise, it is preferred that the heterogeneous copolymer layer of the multilayer film of this invention comprise a member selected from the group consisting of ethylene-butene-hexene and ethylene-propylene-hexene.

In the best mode, the multilayer film of this invention comprises a first outer layer of a poly-1-butene polymer having a melt index of about 1 decigram per minute, and a second outer layer of a low pressure, low density polyethylene having a melt index of between about 0.6 and about 1.5 decigrams per minute and a density of about 0.917 to 0.930 g./cc. Likewise, it is preferred that the multilayer film be produced by the blown film coextrusion process wherein conventional slip and antiblock agents have been added thereto. The poly-1-butene layer may be pigmented using a masterbatch made with poly-1-butene as the vehicle or base. The second outer layer may also be pigmented and contain conventional slip and antiblock agents, as well as small quantities of high pressure, low density polyethylene, i.e., up to about 5 percent by weight of the second outer layer composition.

In addition to the improved physical properties of the multilayer film of this invention being predicated on the poly-1-butene polymers employed herein, the thickness ratio of poly-1-butene polymer layer or layers to low pressure, low density polyethylene layer or layers is also a major contributing factor. More specifically, it has been found that the preferred thickness ratio of the poly-1-butene polymer layer to low pressure, low density polyethylene layer is between about 1:7 and 1:4 wherein the first outer poly-1-butene layer represents between about 12% and about 20% of the total film thickness.

Further, the multilayer film composition of this invention may comprise a first outer layer of poly-1-butene and a second outer layer comprising low pressure, low density polyethylene or a blend of low pressure, low density polyethylene and high pressure, low density polyethylene. When so constructed, it is preferred that said second outer layer contain less than 10 percent by weight of the high pressure, low density polyethylene. In similar fashion, the multilayer film composition of this invention may comprise a first outer layer of poly-1-butene to which a colorant selected from a pigment or dye such as green or black may be added; and a second outer layer comprising low pressure, low density polyethylene or a blend of said low pressure, low density polyethylene and high pressure, low density polyethylene to which a colorant has been added.

Further, the multilayer film composition of this invention may comprise a first outer layer of poly-1-butene and a second outer layer comprising low pressure, low density polyethylene containing up to about 10 percent by weight of poly-1-butene. With these materials the thickness of the multilayer film should comprise between about 12 to 20 percent from said first outer layer, and between about 80 to 88 percent from said second outer layer.

Further still, the multilayer film composition of this invention may comprise a first outer layer of poly-1- butene, a core layer comprising one or more films wherein at least one of the films comprises low pressure, low density polyethylene or blends of low pressure, low density polyethylene containing up to about twenty percent by weight of poly-1-butene, and a second outer layer comprising low pressure, low density polyethylene or blends of low pressure, low density polyethylene containing up to about forty percent by weight of high pressure, low density polyethylene, and up to about twenty percent by weight of poly-1-butene.

The multilayer film composition of this invention is preferably prepared by simultaneously coextruding one or more layers of poly-1-butene and one or more layers comprising low pressure, low density polyethylene, or the aforementioned blends containing low pressure, low density polyethylene, high pressure, low density polyethylene, and poly-1-butene.

The total thickness of the multilayer film is generally between about 1 mil and about 3 mils. Substantially thinner films would usually not be suitable because the strength properties of the film would be unacceptably low for use as a trash or garbage bag. Films substantially thicker than 3 mils are not preferred since the additional strength associated with thicker material is ordinarily not required for trash-garbage bag usage. A further disadvantage of thicker films is the resulting difficulty in handling and tying the bag open end. A preferred balance of these opposing considerations is a film between about 1.3 and 1.8 mils thick.

Illustrative, non-limiting examples of the features and practice of the invention are set out below. The parts and percentages set forth herein refer to parts by weight and percentages by weight, respectively, unless specifically stated otherwise.

In the following examples, the sample multilayer films were formed by co-extrusion of the film layers through a tubular die.

All the multilayer film compositions were prepared by extrusion on a standard laboratory blown film line using a six inch 3-layer tubular die having a 30 mil lip opening. Samples A and B, the control samples, were produced in a 2:1 first outer:second outer layer thickness ratio. The first outer layer material comprised low pressure, low density polyethylene having a melt index of about 1 decigram per minute and a density of about 0.918 grams per cubic centimeter, and in addition contained about 1.4% pigment, a total of 1% of slip agent, antiblock agent and antioxidant, and between 1 and 4% high pressure, low density polyethylene as the resin vehicle of the masterbatch used to incorporate these additives into the low pressure, low density polyethylene polymer. The second outer (i.e., inner) layer material comprised high pressure, low density polyethylene having a melt index of about 2 decigrams per minute and a density of about 0.92 grams/cm$^3$, and contained between about 28 and about 60% of the low pressure, low density polyethylene material of the first outer layer. This second outer layer was also pigmented with about 3% of a black pigment and in addition contained between about 0.4 and 1.0% of the pigments used in the first outer layer simulating the use of self-reclaim in the black layer. In addition, the second outer layer also contained a total of about 1% of slip and anti-blocking agents, and antioxidant.

Samples C, D, E and F were produced in layer thickness ratios of 1:6, 1:3, and 1:2. The first outer layer material comprised poly-1-butene having a melt index of about 1 decigram per minute and contained between about 1 and 4% of a light green pigment. The second outer (i.e., inner) layer comprised low pressure, low density polyethylene having a melt index of about 1 decigram per minute and a density of about 0.918 grams per cubic centimeter and pigmented with about 3% of a black pigment. In addition, both outer layers each contained a total of about 1% of slip and anti-block agents. Also, the second outer layer contained between 2 and 14% of the poly-1-butene material employed in the first outer layer.

Samples G, H and I were similar to samples C, D, and E except that the first outer layer material comprised low pressure, low density polyethylene having a melt index of about 1 decigram per minute and a density of about 0.918 grams per cubic centimeter and pigmented with about 3% of a black pigment. The second outer (i.e., inner) layer comprised poly-1-butene having a melt index of about 1 decigram per minute and contained 2 to 4% of a light green pigment. Both outer layers each contained a total of about 1% of slip and anti-block agents. In addition, the first outer layer contained between 2 and 10% of poly-1-butene as in the second outer layer. Samples J and K were similar to control samples A and B, that is, they contained no poly-1-butene.

The formulations for the control and experimental films are shown in the following Table I. Table II lists the physical property values obtained for the samples produced. The thickness of all the aforementioned multilayer film samples was about 1.5 mils. Further, in Table II, the following test criteria were used. Tensile strength was measured by ASTM D882 method A. Load at break was reported in pounds per square inch.

Elmendorf tear strength was measured by ASTM D1992 and is reported in grams (gms) per mil.

Puncture toughness is a test originated to evaluate the relative resistance of a film to being punctured. There is no ASTM standard method. Basically, a ¾ inch round steel plunger is pushed through a clamped film specimen at a speed of 20 inches per minute using a modified Instron Tester. The load to puncture of the film specimen is recorded in pounds (lbs) per mil and the energy to puncture is the integrated area under the load-elongation curve and is recorded in inch-pounds (in.-lbs) per mil.

Melt index was determined by ASTM D1238-Condition E, measured at 190° C. and reported as grams per 10 minutes.

TABLE I

| SAMPLE | LAYER | LAYER RATIO | POLY-1-BUTENE | LOW PRESSURE, LOW DENSITY POLYETHYLENE | HIGH PRESSURE, LOW DENSITY POLYETHYLENE | MASTERBATCH* | | | | | |
|---|---|---|---|---|---|---|---|---|---|---|---|
| | | | | | | I | II | III | IV | V | VI |
| A | Outer | 2 | — | 94.1 | — | | 3.5 | | | 2.4 | |
| | Inner | 1 | — | 57.4 | 33.0 | | 2.1 | 4.1 | 1.4 | 2.0 | |
| B | Outer | 2 | — | 94.1 | — | | 3.5 | | | 2.4 | |
| | Inner | 1 | — | 28.7 | 62.8 | | 1.0 | 3.0 | 2.5 | 2.0 | |
| C | Outer | 1 | 92.0 | — | — | 8.0 | | | | | |

TABLE I-continued

| SAMPLE | LAYER | LAYER RATIO | POLY-1-BUTENE | FORMULATIONS LOW PRESSURE, LOW DENSITY POLYETHYLENE | HIGH PRESSURE, LOW DENSITY POLYETHYLENE | MASTERBATCH* I | II | III | IV | V | VI |
|---|---|---|---|---|---|---|---|---|---|---|---|
| | Inner | 6 | 2.3 | 89.6 | — | 0.2 | | 2.0 | 3.5 | 2.4 | |
| D | Outer | 1 | 95.0 | — | — | 5.0 | | | | | |
| | Inner | 3 | 9.5 | 82.1 | — | 0.5 | | 2.0 | 3.5 | 2.4 | |
| E | Outer | 1 | 95.0 | — | — | 5.0 | | | | | |
| | Inner | 3 | 4.8 | 87.1 | — | 0.2 | | 2.0 | 3.5 | 2.4 | |
| F | Outer | 1 | 97.0 | — | — | 3.0 | | | | | |
| | Inner | 2 | 14.6 | 77.0 | — | 0.5 | | 2.0 | 3.5 | 2.4 | |
| G | Outer | 6 | 2.3 | 90.5 | — | 0.2 | | 2.0 | 3.5 | | 1.5 |
| | Inner | 1 | 92.0 | — | — | 8.0 | | | | | |
| H | Outer | 6 | 4.6 | 88.2 | — | 0.2 | | 2.0 | 3.5 | | 1.5 |
| | Inner | 1 | 92.0 | — | — | 8.0 | | | | | |
| I | Outer | 3 | 9.5 | 83.0 | — | 0.5 | | 2.0 | 3.5 | | 1.5 |
| | Inner | 1 | 95.0 | — | — | 5.0 | | | | | |
| J | Outer | 2 | — | 95.0 | — | | 3.5 | | | | 1.5 |
| | Inner | 1 | — | 29.5 | 62.7 | | 1.0 | 3.0 | 2.5 | | 1.3 |
| K | Outer | 2 | — | 95.0 | — | | 3.5 | | | | 1.5 |
| | Inner | 1 | — | 58.1 | 33.0 | | 2.1 | 4.1 | 1.4 | | 1.3 |

*MASTERBATCH DESCRIPTION:
I GREEN PIGMENTS IN A POLY-1-BUTENE RESIN BASE.
II GREEN PIGMENTS, SLIP AND ANTIBLOCK AGENTS IN HIGH PRESSURE LOW DENSITY POLYETHYLENE BASE.
III BLACK PIGMENT AND ANTIBLOCK AGENT IN HIGH PRESSURE LOW DENSITY POLYETHYLENE BASE.
IV BLACK PIGMENT, SLIP AND ANTIBLOCK AGENTS IN HIGH PRESSURE LOW DENSITY POLYETHYLENE BASE.
V ANTIBLOCK AGENT IN HIGH PRESSURE LOW DENSITY POLYETHYLENE BASE.
VI ANTIBLOCK AGENT IN LOW PRESSURE LOW DENSITY POLYETHYLENE BASE.

TABLE II

| | ELEMENDORF TEAR STRENGTH (GRAMS/MIL) | | TENSILE STRENGTH (PSI) | | ELONGATION (PERCENT) | | PUNCTURE TOUGHNESS OUTER LAYER | | INNER LAYER | |
|---|---|---|---|---|---|---|---|---|---|---|
| SAMPLE | MD | TD | MD | TD | MD | D | (LB/MIL) LOAD | (IN-LB/MIL) ENERGY | (LB/MIL) LOAD | (IN-LB/MIL) ENERGY |
| (Control) A | 107 | 338 | 3540 | 2880 | 575 | 585 | 4.5 | 6.4 | 4.3 | 6.1 |
| (Control) B | 89 | 334 | 3170 | 2750 | 553 | 581 | 5.2 | 8.3 | 4.2 | 5.9 |
| C | 217 | 284 | 3350 | 3440 | 415 | 570 | 6.7 | 12.0 | 4.9 | 7.8 |
| D | 248 | 350 | 3400 | 3280 | 325 | 505 | 6.8 | 11.0 | 5.2 | 8.4 |
| E | 235 | 308 | 3390 | 3260 | 350 | 540 | 6.6 | 10.8 | 4.9 | 7.6 |
| F | 152 | 387 | 3930 | 3330 | 285 | 435 | 8.2 | 11.2 | 5.7 | 7.9 |
| G | 145 | 326 | 3220 | 3100 | 385 | 480 | 5.2 | 8.0 | 6.3 | 10.6 |
| H | 198 | 303 | 3490 | 3420 | 390 | 530 | 5.5 | 10.1 | 6.6 | 11.1 |
| I | 185 | 372 | 3540 | 3430 | 375 | 495 | 6.0 | 9.7 | 6.0 | 9.0 |
| (Control) J | 113 | 290 | 2940 | 3000 | 520 | 575 | 4.7 | 6.4 | 4.0 | 4.7 |
| (Control) K | 124 | 282 | 3200 | 2900 | 539 | 575 | 4.8 | 7.1 | 4.3 | 4.2 |

MD means machine direction.
TD means transverse direction.
OUTER LAYER PUNCTURE TOUGHNESS indicates that the probe contacts the film from the outer layer.
INNER LAYER PUNCTURE TOUGHNESS indicates that the probe contacts the film from the inner layer.

It can be seen from the values obtained in Table II that the machine direction Elmendorf tear strength, puncture toughness load and energy, and both machine direction and transverse direction tensile strength are improved over the control films. While the elongation to break in the machine direction for the experimental products is lower than the controls, it is considerably higher than expected for pure poly-1-butene and appears to provide the desirable stretch characteristics of low pressure, low density polyethylene. The improvements noted are maintained even when the poly-1-butene layer is decreased to a level in which the poly-1-butene content is as low as about 15 to 18% of the total multilayer structure as shown for those films having a poly-1-butene: low pressure, low density polyethylene layer ratio of 1:6, respectively.

Further, additional polymeric coextruded resin layers may be employed herein for specific or various requirements where desired while maintaining the advantage of this invention. Obviously, the individual layers of the multilayer films herein may be natural as well as colored, and various combinations of layers and layer ratios are possible within the scope of the instant invention.

Although preferred embodiments of this invention have been described in detail, it is contemplated that modifications thereof may be made and that some features may be employed without others, all within the spirit and scope of the invention. For example, although the films described in the foregoing examples were prepared by blown film extrusion, other preparative methods may be used as, for example, slot cast extrusion.

I claim:

1. A multilayer film consisting essentially of a first outer layer of poly-1-butene and a second outer layer comprising low pressure, low density polyethylene wherein said poly-1-butene has a melt index of between about 1 and about 2 decigrams per minute and wherein said low pressure, low density polyethylene has a melt index of between about 0.3 and about 3.0 decigrams per minute and a density between about 0.91 and about 0.94 grams per cubic centimeter.

2. A multilayer film as in claim 1 wherein said low pressure, low density polyethylene comprises a copolymer formed from ethylene and a comonomer selected from butene, pentene, hexene, heptene and octene.

3. A multilayer film as in claim 1 wherein said low pressure, low density polyethylene has a melt index of between about 0.5 and about 2.0 decigrams per minute.

4. A multilayer film as in claim 1 wherein said low pressure, low density polyethylene has a density of between about 0.916 and about 0.925 grams per cubic centimeter.

5. A multilayer film as in claim 1 wherein said low pressure, low density polyethylene has a density of between about 0.917 and about 0.920 grams per cubic centimeter.

6. A multilayer film as in claim 1 wherein said low pressure, low density polyethylene comprises a copolymer of ethylene and butene-1.

7. A multilayer film as in claim 1 wherein said second outer layer comprises a blend of said low pressure, low density polyethylene and up to about 20 percent by weight of poly-1-butene based on the weight of said second outer layer.

8. A multilayer film as in claim 1 wherein said low pressure, low density polyethylene comprises heterogeneous copolymers formed from ethylene, at least one of propylene and butene-1, and at least one $C_5$–$C_8$ comonomer.

9. A multilayer film as in claim 8 wherein said second outer layer comprises a blend of poly-1-butene and said heterogeneous copolymers formed from ethylene, at least one of propylene and butene-1, and at least one $C_5$–$C_8$ comonomer.

10. A multilayer film as in claim 8 wherein said copolymers have a melt index of between about 0.5 and about 2.0 decigrams per minute and a density of between about 0.917 and about 0.930 grams per cubic centimeter.

11. A multilayer film as in claim 8 wherein said heterogeneous copolymers are selected from the group consisting of ethylene-butene-hexene and ethylene-propylene-hexene.

12. A multilayer film as in claim 1 wherein said poly-1-butene has a melt index of about 1 decigram per minute and said low pressure, low density polyethylene has a melt index of between about 0.6 and about 1.5 decigrams per minute.

13. A multilayer film as in claim 1 wherein the thickness ratio of said first outer layer to said second outer layer is between about 1:7 and 1:4.

14. A multilayer film as in claim 1 wherein the total thickness of said multilayer film is between about 1 mil and about 3 mils.

15. A multilayer film as in claim 1 wherein said second outer layer comprises a blend of said low pressure, low density polyethylene and up to about 10 percent by weight of high pressure, low density polyethylene based on the weight of said second outer layer.

16. A multilayer film as in claim 1 wherein said film is formed into a bag.

17. A multilayer film consisting essentially of a first outer layer of poly-1-butene and a second outer layer comprising a blend of low pressure, low density polyethylene and up to about 20 percent by weight of poly-1-butene based on the weight of said second outer layer wherein said poly-1-butene has a melt index of between about 1 and about 2 decigrams per minute and wherein said low pressure, low density polyethylene has a melt index of between about 0.3 and about 3.0 decigrams per minute and a density between about 0.91 and about 0.94 grams per cubic centimeter.

18. A multilayer film as in claim 17 wherein said film is formed into a bag.

19. A multilayer film consisting essentially of a first outer layer of poly-1-butene, a core layer comprising one or more films wherein at least one of said films comprises low pressure, low density polyethylene, and a second outer layer comprising low pressure, low density polyethylene wherein said poly-1-butene has a melt index of between about 1 and about 2 decigrams per minute and wherein said low pressure, low density polyethylene has a melt index of between about 0.3 and about 3.0 decigrams per minute and a density between about 0.91 and about 0.94 grams per cubic centimeter.

20. A multilayer film as in claim 19 wherein said second outer layer contains up to about 20 percent by weight of poly-1-butene based on the weight of said second outer layer.

21. A multilayer film as in claim 19 wherein said second outer layer contains up to about 40 percent by weight of high pressure, low density polyethylene based on the weight of said second outer layer.

22. A multilayer film as in claim 19 wherein said core layer contains up to about twenty percent by weight of poly-1-butene based on the weight of said core layer.

23. A multilayer film as in claim 19 wherein said film is formed into a bag.

24. A method of preparing a multilayer film consisting essentially of coextruding a first outer layer of poly-1-butene and a second outer layer comprising low pressure, low density polyethylene wherein said poly-1-butene has a melt index of between about 1 and about 2 decigrams per minute and wherein said low pressure, low density polyethylene has a melt index of between about 0.3 and about 3.0 decigrams per minute and a density between about 0.91 and about 0.94 grams per cubic centimeter.

* * * * *